United States Patent [19]

Lighthall et al.

[11] 3,889,198

[45] June 10, 1975

[54] VOLTAGE WAVEFORM GENERATOR INCLUDING FEEDBACK ARRANGEMENT FOR RESTORING VOLTAGE TO INITIAL CONDITION

[75] Inventors: John T. Lighthall, Brockville, Ontario; Robert W. Thomas, Maitland, Ontario, both of Canada

[73] Assignee: GTE Automatic Electric (Canada) Ltd., Brockville, Ontario, Canada

[22] Filed: Feb. 22, 1974

[21] Appl. No.: 444,888

[52] U.S. Cl. .................. 328/59; 307/228; 307/229; 307/260; 328/127

[51] Int. Cl.$^2$... H03K 3/04; H03K 5/00; G06G 7/12

[58] Field of Search............ 307/229, 228, 260-264, 307/268; 328/127, 59-61

[56] References Cited

UNITED STATES PATENTS 3,092,824 6/1963 Bentley et al. ..................... 307/229

3,783,392 1/1974 Drake et al. ........................ 307/229

OTHER PUBLICATIONS

"A Bipolar Signal Waveform Generator," in IEEE Transactions on Communications, by Mark et al., Dec. 1972, pages 1198–1200.

*Primary Examiner*—Stanley D. Miller, Jr.

*Attorney, Agent, or Firm*—David M. Keay; Robert T. Orner; Theodore C. Jay, Jr.

[57] ABSTRACT

Voltage waveform generator including an integrator circuit and a source of reference voltage. Different resistances are connected in order in a series circuit between the source of reference voltage and the input to the integrator circuit to vary the rate at which the output voltage of the integrator circuit changes, thereby producing a desired output voltage waveform. Resistances are switched in and out of the series circuit as determined by the decoded output of a counter which counts periodic clock pulses. A feedback arrangement is coupled between the output and the input of the integrator circuit for restoring the integrator circuit to its starting condition prior to each period during which a waveform is produced.

11 Claims, 4 Drawing Figures

FOLDED BINARY CODE

| COUNTER STATE | DC1 | DC2 | DC3 | DC4 | DC5 | DC6 | DC7 | DC8 |
|---|---|---|---|---|---|---|---|---|
| +128 | 1 | 0 | 0 | 0 | 0 | 0 | 0 | 0 |
| +127 | 1 | 0 | 0 | 0 | 0 | 0 | 0 | 1 |
| ⋮ | | | | | | | | |
| +3 | 1 | 1 | 1 | 1 | 1 | 1 | 0 | 1 |
| +2 | 1 | 1 | 1 | 1 | 1 | 1 | 1 | 0 |
| +1 | 1 | 1 | 1 | 1 | 1 | 1 | 1 | 1 |
| −1 | 0 | 1 | 1 | 1 | 1 | 1 | 1 | 1 |
| −2 | 0 | 1 | 1 | 1 | 1 | 1 | 1 | 0 |
| −3 | 0 | 1 | 1 | 1 | 1 | 1 | 0 | 1 |
| ⋮ | | | | | | | | |
| −127 | 0 | 0 | 0 | 0 | 0 | 0 | 0 | 1 |
| −128 | 0 | 0 | 0 | 0 | 0 | 0 | 0 | 0 |

COUNTER STARTS AT STATE −128 AND PROGRESSES TO STATE +128

VOLTAGE WAVEFORM GENERATOR INCLUDING FEEDBACK ARRANGEMENT FOR RESTORING VOLTAGE TO INITIAL CONDITION

BACKGROUND OF THE INVENTION

This invention relates to apparatus for generating waveforms. More particularly, it is concerned with voltage waveform generators which repeatedly sweep through a predetermined pattern of voltages.

There are many applications requiring apparatus which produces voltage waveforms. Certain applications employ waveforms which repeatedly sweep from one voltage to another in a predetermined non-linear fashion. Presently available waveform generators for producing non-linear voltage waveforms are complex and expensive.

SUMMARY OF THE INVENTION

Improved waveform generating apparatus in accordance with the present invention comprises an integrating means which has an input connection and an output connection. The apparatus also includes a source of reference potential and a plurality of switch means together with a like plurality of resistances. The switch means and resistances are arranged in a plurality of series circuits. Each series circuit includes one of the switch means and one of the resistances in series, and all the series circuits are connected in parallel between the source of reference potential and the input connection of the integrating means. The integrating means produces an output voltage at its output connection which varies at a rate determined by the combination of the voltage applied at its input connection through a resistance and the value of the resistance connected between the source of the voltage and the input connection. A control means is coupled to the plurality of switch means and operates to close and open the switch means of the plurality in a predetermined sequence. Thus, the value of resistance between the source of reference potential and the input connection of the integrating means is varied thereby changing the rate at which the output voltage at the output connection of the integrating means is changing.

A specific embodiment of a voltage waveform generator in accordance with the present invention is utilized in apparatus described in application Ser. No. 444,891 filed concurrently herewith by Robert M. Thomas entitled "PCM Encoder-Decoder Apparatus". The voltage waveform generator is particularly useful in an analog-to-digital and digital-to-analog converter employed in the apparatus described in the aforementioned application and also described in application Ser. No. 444,890 also filed concurrently herewith by Robert M. Thomas entitled "Analog-to-Digital and Digital-to-Analog Converter Apparatus".

BRIEF DESCRIPTION OF THE DRAWINGS

Additional objects, features, and advantages of voltage waveform generators in accordance with the present invention will be apparent from the following detailed discussion together with the accompanying drawings wherein.

DETAILED DESCRIPTION OF THE INVENTION

Figures 1, 3:
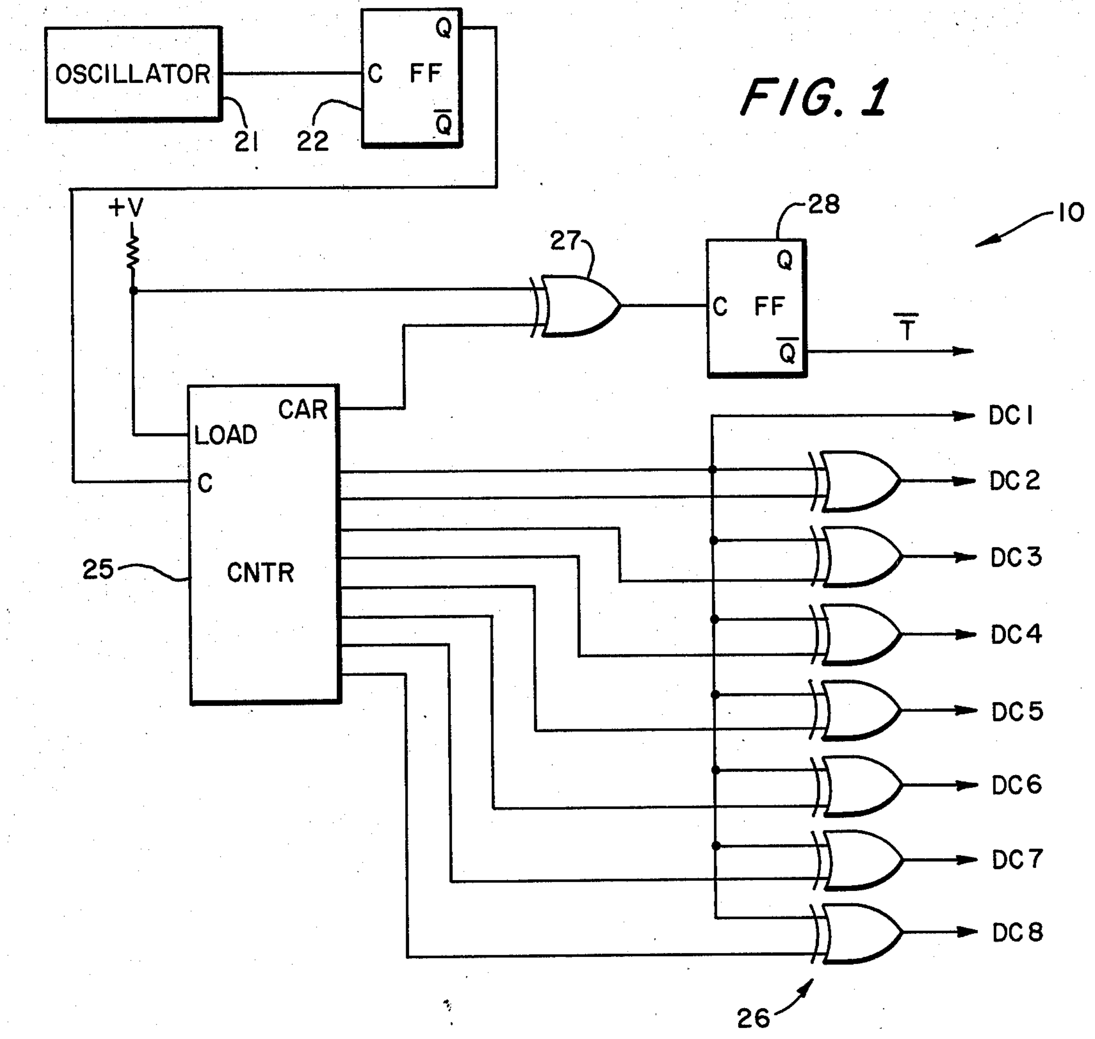
FIG. 1 is a logic diagram of a timing and control section of the apparatus of the invention.
FIG. 3 is a table showing a folded binary code as produced in the timing and control section of FIG. 1.
Figure 2:
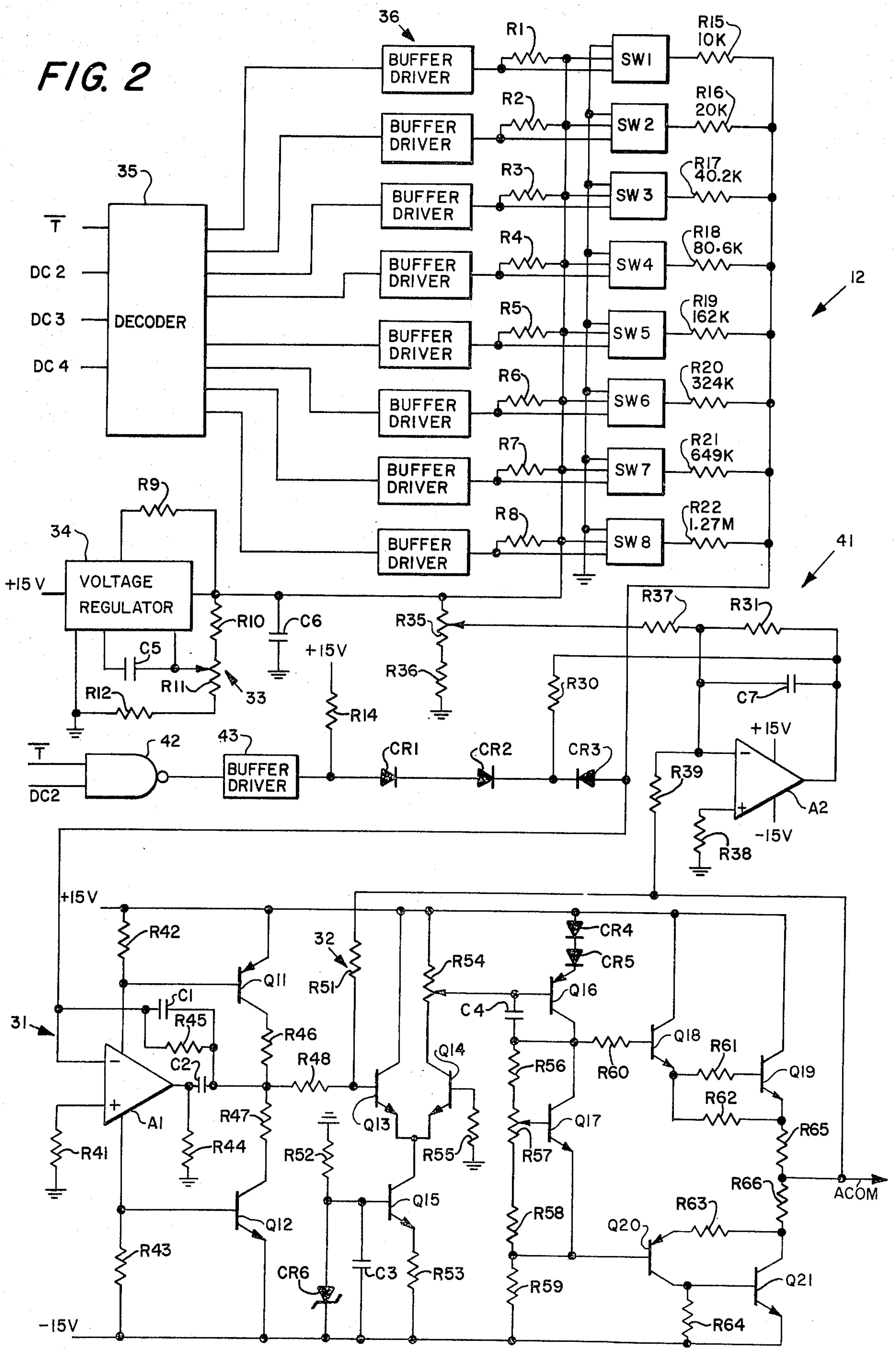
FIG. 2 is a detailed diagram of an analog voltage waveform generator in accordance with the present invention.

FIG. 1 is a logic diagram of a timing and control section 10 which produces signals which are employed to control the operation of the voltage waveform generator of FIG. 2. The timing and control section 10 includes a master oscillator 21 which produces output pulses which for the purposes of discussion of a specific embodiment are at the rate of 8,192 KHz. A flip-flop 22 serves as a divider to generate squarewave pulses at 4,096 KHz at its Q output.

The Q output of the flip-flop 22 is connected to the clock input of a counter 25. The counter 25 is enabled continuously by a high level voltage at its load input. The counter counts continuously through a recurring sequence of 256 states in response to clock pulses from the flip-flop 22. Since the rate of the pulses counted is 4,096 KHz, a complete sequence of 256 operating states of counter 25 occurs every 62.5 microseconds. Eight output connections from the counter are applied to a network of exclusive-OR gates 26. The counter counts through 256 states designated −128 to +128 and produces signals DC1 through DC8 at the outputs of the exclusive-OR gates 26. The 8-bit digital signals on lines DC1 to DC8 conform to the folded binary code shown in the table of FIG. 3.

The carry output terminal of the counter 25 is connected to one input of an exclusive-OR gate 27. The other input to the exclusive-OR gate 27 is applied to a flip-flop 28. The $\overline{Q}$ output of the flip-flop 28 is connected to a line designated $\overline{T}$. The counter 25 and flip-flop 28 cause the signal on the $\overline{T}$ line to change levels upon completion of each count of 256 pulses, or every 62.5 microseconds. For control of the waveform generator of of FIG. 2 only the signals on the DC2, DC3, and DC4 lines together with the signal on the $\overline{T}$ line are used.

Figure 4:
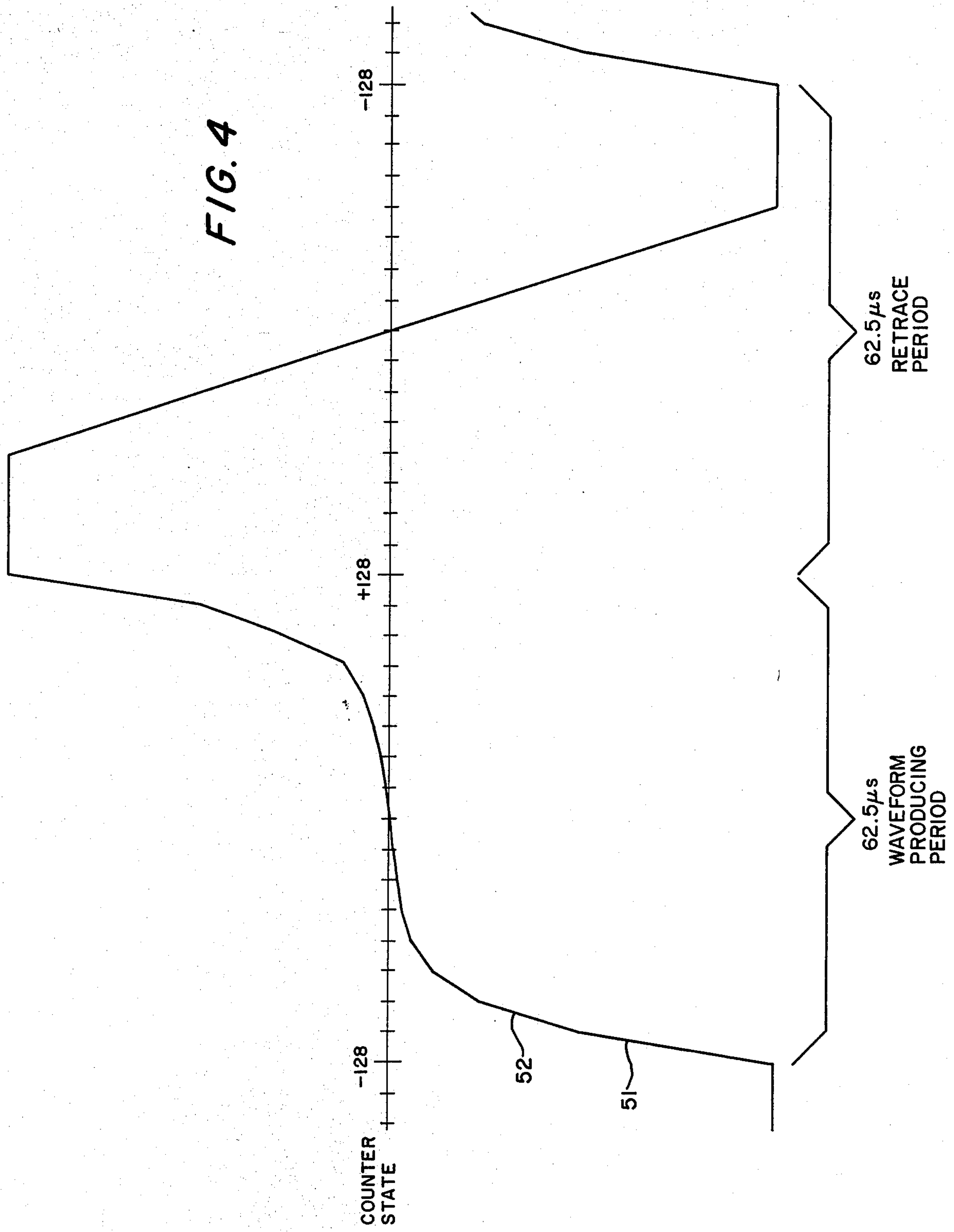
FIG. 4 is a curve of the voltage waveform produced by the voltage waveform generator of FIG. 2.

The voltage waveform generator 12 is illustrated in FIG. 2. The voltage curve produced by the waveform generator on the ACOM line is illustrated in FIG. 4. The waveform generator includes an integrator circuit 31 employing an integrator operational amplifier A1. The input to the integrator circuit is by way of the line connected to the inverting or − input of the amplifier A1. The non-inverting or + input is connected through a resistance R41 to ground. An integrating capacitor C1 is connected through a capacitor C2 to the output of the amplifier A1 and directly to the − input. A resistance R45 is connected in parallel with the integrating capacitor C1. This resistance reduces the low frequency gain of the amplifier A1 and this essentially eliminates certain noise problems. A resistance R44 is connected between the output of the amplifier A1 and ground. A PNP transistor Q11 and an NPN transistor Q12 are connected to the output of the amplifier as shown in FIG. 2 in order to provide additional driving power.

A positive reference voltage of 10 volts is supplied by a source of reference voltage 33 which includes a voltage regulator 34 together with other components as shown. The reference voltage is applied to the − input of the integrator amplifier A1 through one of a set of resistances R15 through R22 as determined by which of switches SW1 through SW8 is closed by the output of a decoder 35 acting through buffer drivers 36. The output voltage of the integrator circuit 31 decreases at a rate depending upon the value of the resistance connected between the positive reference source and the − input of the amplifier A1, and the value of the integrating capacitor C1, in accordance with the relationship V(Ref)/R C1 where V(Ref) is the reference voltage, R is the value of the resistance in series between the reference voltage and the input connection, and C1 is the value of the integrating capacitor C1. The value of the reference voltage V(Ref) from the source 33 is adjustable by adjusting the tap on resistance R11. Some control is necessary in order to compensate for variables in the various components of the apparatus which affect gain.

The decoder 35 decodes the signals on lines DC2, DC3, and DC4 to activate one of its output connections which acts through the corresponding one of the buffer drivers 36 to operate one of FET switches SW1 through SW8. The decoder is also connected to the $\overline{T}$ line and is enabled thereby when the signal thereon is at a low or 0 logic level, and is inhibited when the signal on the $\overline{T}$ line is high or at 1 logic lever. Thus, the decoder 35 is enabled and inhibited in alternation for every 62.5 microsecond period of a full operating cycle of 125 microseconds.

When any of the switches SW1 to SW8 are inactive, or open, the resistances connected thereto have one terminal connected to ground. When a switch is activated, or closed, the particular resistance R15 through R22 associated therewith is connected to the positive source of voltage of 10 volts produced by the reference voltage source 33. As shown in FIG. 2 each of the resistances in order from R15 to R22 is of twice the resistance value of the preceding resistance. Thus, each resistance when connected between the source of reference voltage and the input to the integrator amplifier A1 causes the output voltage of the integrator circuit 31 to change at one-half the rate caused by the preceding resistance in order. When the resistances are connected in reverse order, the rate of change of the output voltage will double for each change in resistance.

An inverting circuit 32 is connected to the output of the integrator amplifier A1 of the integrator circuit 31. The inverting circuit includes a differential amplifier circuit employing two NPN transistors Q13 and Q14. The output from the collector of transistor Q14 is applied to an arrangement of transistors Q16, Q17, Q18, Q19, Q20 and Q21 as shown in FIG. 2 which are connected so as to provide additional driving power. The inverting circuit provides a power operational amplifier with an inverting input and a gain equal to − R51/R48. The circuit has a great deal of driving power and low output impedance. The output signal of the inverting circuit 32 occurs on the ACOM line and is an inversion of the signal from the integrator circuit 31. The waveform produced on the ACOM line during each waveform producing period of 62.5 microseconds is shown in FIG. 4.

The apparatus of FIG. 2 also includes a feedback arrangement 41 which restores the apparatus to its initial condition during a restoring or retrace period subsequent to each waveform producing period. The feedback arrangement 41 includes a feedback operational amplifier A2 having its inverting or − input connected to the ACOM line through a resistance R39. The non-inverting or + input is connected through a resistance R38 to ground. The output connection of the feedback amplifier A2 is coupled to its − input by a resistance R31 and a capacitance C7 connected in parallel. The − input of the feedback amplifier A2 is connected through a resistance R37 to an adjustable tap on a resistance R35. Resistance R35 is connected in series with resistance R36 between the positive reference voltage source 33 and ground.

The output of the feedback operational amplifier A2 is connected to the − input of the integrator operational amplifier A1 by way of a resistance R30 and a switching arrangement which includes a diode CR3 connected in series between the resistance R30 and the − input to the integrator amplifier A1. The switching arrangement also includes a source of positive voltage connected in series through a resistance R14 and diodes CR1 and CR2 to the juncture of resistance R30 and diode CR3. The switch arrangement is controlled by the signals on the $\overline{T}$ and DC2 lines. The $\overline{T}$ and DC2 lines are connected to a NAND gate 42 which operates a buffer driver 43 having its output connected to the juncture of resistance R14 and diode CR1.

The voltage waveform generator 12 operates as follows during a 62.5 microsecond waveform producing period of each operating cycle during which the signal on the $\overline{T}$ line is low. The output of the waveform generator on the ACOM line is shown in FIG. 4. At the start of the waveform producing period the counter 25 is in the −128 state and the bits on the DC2, DC3, and DC4 lines are all 0 as shown in the table of FIG. 3. The decoder 35 is enabled by the low level on the $\overline{T}$ line and switch SW1 is activated, or closed. The other seven switches SW2–SW8 are inactive, or open. Thus, resistance R15 is connected between the reference voltage source 33 and the − input to the integrator amplifier A1. The output voltage of the integrator circuit 31 ramps downward at a rate determined by V(Ref)/R C1 as explained previously. This voltage signal is inverted by the inverting circuit 32 and a straight line curve 51 of increasing voltage is produced on the ACOM line as shown in FIG. 4.

This situation continues until after a count of 16 clock pulses have been applied to the counter 25 by the flip-flop 22. At this point the bit on the DC4 line changes from a 0 to a 1. This action changes the decoder output switch SW1 and closing switch SW2. For the next 16 pulses the resistance R16 is connected in series between the reference voltage and the − input to the integrator amplifier A1. Since resistance R16 is twice the value of resistance R15, the output of the integrator circuit 31 and consequently of the inverting circuit 32 changes at one-half the previous rate as illustrated by the portion 52 of the curve of FIG. 4. The decoder output continues to change each 16 clock pulses, thereby continuing to double the value of the resistance between the reference voltage and the integrator input and consequently reducing the ramp rate by one-half.

Halfway through the waveform producing period at 31.2 microseconds after switch SW8 has been closed for 16 pulses, the DC2, DC3, and DC4 bits remain the same (see FIG. 3) causing switch SW8 to remain closed for another 16 pulses. After the 16 additional pulses the input to the decoder 35 changes, opening switch SW8 and closing switch SW7. Operation continues, closing individual switches in reverse order from that during the first half of the wave producing period. Thus, the voltage waveform on the ACOM line during the second half of a waveform producing period as shown in FIG. 4 is the opposite of that produced during the first half.

The resulting waveform consists of a series of straight lines. The particular curve as illustrated herein approximates the standard D2 compression curve used in the communication art as explained in the aforementioned referenced applications. Since the waveform is generated under the direct control of the DC2, DC3, and DC4 bits from the digital counter 25, the waveform is synchronized with the counter.

As explained previously, since the decoder 35 is enabled by a 0 on the $\overline{T}$ line and inhibited by a 1, the desired voltage waveform is generated only during the 62.5 microsecond waveform producing period of each 125 microsecond operating cycle. The voltage waveform generator is restored to its proper starting condition for repeating the waveform by the feedback arrangement 41 which operates during alternate 62.5 microsecond retrace periods.

During each waveform producing period while the waveform is being generated as explained above, the signal on the $\overline{T}$ line is low and, therefore, the output of the NAND gate 42 and consequently of the buffer driver 43 is high. The voltage at the cathode of diode CR3 is thus held sufficiently high to prevent the flow of current therethrough and prevent the output of the feedback amplifier A2 from having any effect on the operation of the integrator circuit 31. During this period the output of the feedback operational amplifier A2 is at a negative potential.

When the signals on the $\overline{T}$ and DC2 lines both become high, the output of the NAND gate 42 changes to low. This action occurs after 64 clock pulses or after one-fourth of the retrace period has elasped as shown in FIG. 4. Diode CR3 is then biased to conduction and current flows from the output of the feedback amplifier A2 through resistance R30 to the − input of the integrator amplifier A1. The output of the integrator circuit 31 ramps upward at a rate determined by the resistance R30, the integrator capacitance C1, and the output voltage of the feedback amplifier A2. These values are such that by the end of the third quarter of the 62.5 microsecond period, at which time the DC2 signal changes to a 0, the integrator output is returned to its starting level and the voltage on the ACOM line is at its maximum negative value. Thus, the waveform generator 12 is restored to its appropriate starting condition as shown in FIG. 4 in preparation for sweeping the next waveform when the counter 25 completes the count and reverts to the −128 state and the signal on the $\overline{T}$ line changes from a 1 to a 0.

The output voltage of the feedback amplifier A2 is proportional to the DC component of the output voltage waveform on the ACOM line plus a constant offset introduced by the resistance R37. Any DC component in the ACOM signal during the waveform producing period causes a compensating change in the rate at which the voltage on the ACOM line slews back to the starting condition during the restoring period. Thus, the ACOM signal waveform is symmetrical about a fixed residual DC offset. This offset can be reduced to zero such as illustrated in the curve of FIG. 4 by adjustment of the tap on the resistance R35 to produce an ACOM waveform which crosses zero volts exactly halfway through the waveform producing period as shown in FIG. 4.

A voltage waveform generator in accordance with the invention as described is extremely versatile in generating waveforms of the type consisting of a series of straight line curve segments. Resistances R15 through R22 of appropriate value may be selected to provide desired ramp rates for each segment of a curve. In addition, the logic arrangement for operating the switches can be changed to control the length of each segment and the sequence of segments.

A specific embodiment of the voltage waveform generator of FIG. 2 has been fabricated employing the following components.

| | | |
|---|---|---|
| Operational Amplifier A1 | | Type 741 |
| Operational Amplifier A2 | | Type 741 |
| Decoder 35 | | Type 74154 |
| Buffer Driver 36 and 43 | | Type 7407 |
| Switch SW1 to SW8 | | Type CA4007AE |
| Voltage Regulator 34 | | Type CA3085 |
| Q11 | 2N2907 | |
| Q12 | 2N2222 | |
| Q13, Q14, Q15, Q17 | RCA CA3183AE transistor array | |
| Q16 | 2N2907 | |
| Q18 | 2N2222 | |
| Q19 | 2N3879B | |
| Q20 | 2N2907 | |
| Q21 | 2N3879B | |
| CR1 | 1N914 | |
| CR2 | 1N914 | |
| CR3 | 1N914 | |
| CR4 | 1N914 | |
| CR5 | 1N914 | |
| CR6 | 6.8 volt Zener diode | |
| C1 | 750pf | |
| C2 | .001 μf | |
| C3 | 1 μf | |
| C4 | 470pf | |
| C5 | .001 μf | |
| C6 | 6.8 μf | |
| C7 | 6.8 μf | |
| R1 | 10 KΩ | |
| R2 | 10 KΩ | |
| R3 | 10 KΩ | |
| R4 | 10 KΩ | |
| R5 | 10 KΩ | |
| R6 | 10 KΩ | |
| R7 | 10 KΩ | |
| R8 | 10 KΩ | |
| R9 | 62 Ω | |
| R10 | 22.1 KΩ | |
| R11 | 1 KΩ | |
| R12 | 3.83 KΩ | |
| R14 | 2 KΩ | |
| R15 | 10 KΩ | |
| R16 | 20 KΩ | |
| R17 | 40.2 KΩ | |
| R18 | 80.6 KΩ | |
| R19 | 162 KΩ | |
| R20 | 324 KΩ | |
| R21 | 649 KΩ | |
| R22 | 1.27 MΩ | |
| R30 | 40.2 KΩ | |
| R31 | 523 KΩ | |
| R35 | 1 KΩ | |
| R36 | 1 KΩ | |
| R37 | 249 KΩ | |
| R38 | 10 KΩ | |
| R39 | 10 KΩ | |
| R41 | 4.99 KΩ | |
| R42 | 180 Ω | |
| R43 | 100 Ω | |
| R44 | 47 Ω | |
| R45 | 976 KΩ | |
| R46 | 39 Ω | |
| R47 | 39 Ω | |
| R48 | 1 KΩ | |
| R51 | 1 KΩ | |
| R52 | 2 KΩ | |
| R53 | 620 Ω | |
| R54 | 1 KΩ | |
| R55 | 510 Ω | |
| R56 | 1 KΩ | |
| R57 | 1 KΩ | |
| R58 | 470 Ω | |

-Continued

| | |
|---|---|
| R59 | 470 Ω |
| R60 | 470 Ω |
| R61 | 15 Ω |
| R62 | 270 Ω |
| R63 | 15 Ω |
| R64 | 270 Ω |
| R65 | 4.7 Ω |
| R66 | 4.7 Ω |

While there has been shown and described what is considered a preferred embodiment of the present invention, it will be obvious to those skilled in the art that various changes and modifications may be made therein without departing from the invention as defined by the appended claims.

What is claimed is:

1. Waveform generating apparatus comprising
integrating means having an input connection and an output connection;
a source of reference potential;
a plurality of switch means;
a like plurality of resistances;
a like plurality of series circuits each connected between said source of reference potential and the input connection of the integrating means, each series circuit including one of the switch means and one of the resistances in series;
said integrating means being operable to produce an output voltage at its output connection which varies at a rate determined by the combination of the voltage applied at its input connection through a resistance and the value of the resistance;
control means coupled to said plurality of switch means and operable to close and open the switch means of said plurality in a predetermined sequence whereby the value of resistance between the source of reference potential and the input connection of the integrating means is varied; and
restoring means coupled to the output connection and to the input connection of the integrating means for producing a predetermined condition at the input connection which causes the integrating means to produce a predetermined voltage at its output connection.

2. Waveform generating apparatus in accordance with claim 1 wherein said control means includes
timing means operable to permit the control means to close and open the switch means of said plurality in said predetermined sequence during a waveform producing period;
said timing means being coupled to said restoring means and being operable to permit the restoring means to operate to produce said predetermined condition at the input connection to the integrating means during a restoring period.

3. Waveform generating apparatus in accordance with claim 1 wherein
said control means includes
a source of periodic clock pulses;
counting means coupled to the source of periodic clock pulses and operable to count through a recurring sequence of operating states in response to periodic clock pulses;
decoding means coupled to said counting means and to each of said plurality of switch means and operable to close and open the switch means of said plurality in a predetermined sequence as determined by the operating states of the counting means; and
cycle control means coupled to said counting means for permitting the decoding means to be operable during a waveform producing period;
said cycle control means being coupled to said restoring means for permitting the restoring means to operate to produce said predetermined condition at the input connection to the integrating means during a restoring period.

4. Waveform generating apparatus in accordance with claim 3 wherein
said integrating means includes
an integrating operational amplifier having first and second input connections and an output connection, said first input connection being coupled to the input connection of the integrating means and said output connection being coupled to the output connection of the integrating means;
an integrating capacitance coupled between the first input connection and the output connection of the integrating operational amplifier;
the rate of change of the voltage at the output connection of the integrating means during a waveform producing period being directly proportional to the voltage of said source of reference potential and inversely proportional to the value of the resistance connected between said source of reference potential and the input connection of the integrating means and to the value of said integrating capacitance.

5. Waveform generating apparatus in accordance with claim 4 wherein
said restoring means includes
a feedback operational amplifier having first and second input connections and an output connection, said first input connection being coupled to the output connection of the integrating means; and
feedback switching means coupling the output connection of the feedback operational amplifier to the input connection of the integrating means;
said feedback switching means being coupled to said cycle control means and being in an open condition during a waveform producing period whereby the feedback operational amplifier has no effect on the integrating means, and being in a closed condition during a restoring period whereby the feedback operational amplifier operates to produce said predetermined condition at the input connection of the integrating means.

6. Waveform generating apparatus in accordance with claim 5 wherein
said cycle control means produces first and second signal conditions in alternation at an output connection during successive sequences of operating states of said counting means;
said decoding means is coupled to the output connection of the cycle control means, said control means being operable during said first signal condition to close and open the switch means of said plurality in said predetermined sequence as determined by the operating states of the counting means and being inoperable during said second signal condition; and said feedback switching means is coupled to the output connection of the cycle control means and is in the open condition during said first signal condition.

7. Waveform generating apparatus in accordance with claim 6 wherein said feedback switching means is coupled to said counting means and is operable in the closed condition during predetermined operating states of the counting means while the second signal condition is being produced by the cycle control means.

8. Waveform generating apparatus in accordance with claim 6 including an output terminal;

an inverting means coupled between the output connection of the integrating means and the output terminal whereby a voltage waveform which is an inversion of the voltage waveform at the output connection of the integrating means is produced at the output terminal;

said output terminal being coupled to the first input connection of the feedback operational amplifier.

9. Waveform generating apparatus in accordance with claim 8 wherein said first input connection of said integrating operational amplifier is an inverting connection; and said first input connection of said feedback operational amplifier is an inverting connection.

10. Waveform generating apparatus in accordance with claim 9 wherein said decoding means is operable to close each of said plurality of switch means one at a time in order during the first half of a waveform producing period and to close each of said plurality of switch means one at a time in reverse order during the second half of a waveform producing period whereby a voltage waveform which is symmetrical about its midpoint is produced at the output terminal.

11. Waveform generating apparatus in accordance with claim 10 wherein said second input connection of said integrating operational amplifier is a non-inverting connection and is coupled to a second source of reference potential;

said second input connection of said feedback operational amplifier is a non-inverting connection and is coupled to said second source of reference potential;

and including a resistance connected between said first-mentioned source of reference potential and said second source of reference potential;

said resistance having an adjustable tap coupled to the inverting input of the feedback operational amplifier whereby the DC offset of the midpoint of the symmetrical voltage waveform produced at the output terminal may be adjusted.

* * * * *